F. P. STEVENS.
FLUID CONTROLLING MEANS.
APPLICATION FILED APR. 20, 1907.

902,264.

Patented Oct. 27, 1908.

3 SHEETS—SHEET 1.

F. P. Stevens, Inventor,

Witnesses
Howard D. Orr.

By E. G. Siggers
Attorney

F. P. STEVENS.
FLUID CONTROLLING MEANS.
APPLICATION FILED APR. 20, 1907.

902,264.

Patented Oct. 27, 1908.
3 SHEETS—SHEET 2.

Witnesses
Howard D. Orr.

F. P. Stevens, Inventor,
By E. G. Siggers
Attorney

F. P. STEVENS.
FLUID CONTROLLING MEANS.
APPLICATION FILED APR. 20, 1907.

902,264.

Patented Oct. 27, 1908.
3 SHEETS—SHEET 3.

Witnesses
Howard N. Orr
B. F. Foster

F. P. Stevens, Inventor,
By E. G. Siggers
Attorney

UNITED STATES PATENT OFFICE.

FRED PARK STEVENS, OF DENVER, COLORADO, ASSIGNOR OF ONE-HALF TO J. ARTHUR EDDY, OF DENVER, COLORADO.

FLUID-CONTROLLING MEANS.

No. 902,264.      Specification of Letters Patent.      Patented Oct. 27, 1908

Application filed April 20, 1907. Serial No. 369,290.

*To all whom it may concern:*

Be it known that I, FRED P. STEVENS, a citizen of the United States, residing at Denver, in the county of Denver and State of Colorado, have invented a new and useful Fluid-Controlling Means, of which the following is a specification.

This invention relates to means for controlling the passageway of fluid from or to a container of any character, and is clearly capable of use with fluids of a gaseous or liquid nature, as will be evident when the nature of the invention is understood.

The principal object of the present invention is to provide novel and simple controlling means, by which the amount of fluid passing the same can be quickly and accurately regulated to any amount desired, or can be cut off entirely, means being employed for indicating the position of the parts or the amount of flow of fluid permitted thereby.

Two embodiments of the invention are herein disclosed, but it will be clear from an inspection of the appended claims that the invention is not limited to the structures set forth and that said structures are open to various modifications within the scope of said claims.

Figure 1:
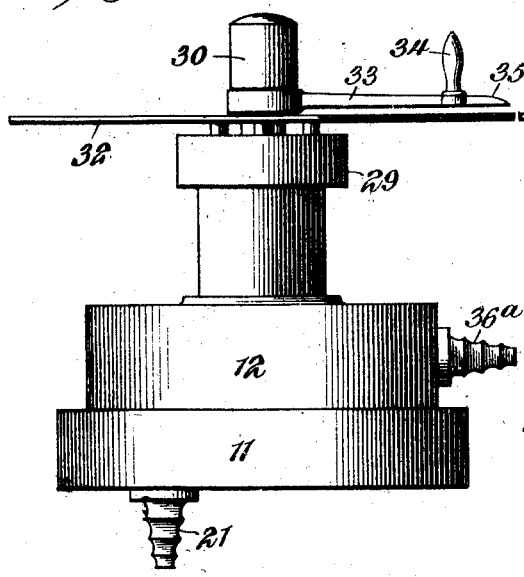
Figure 2:
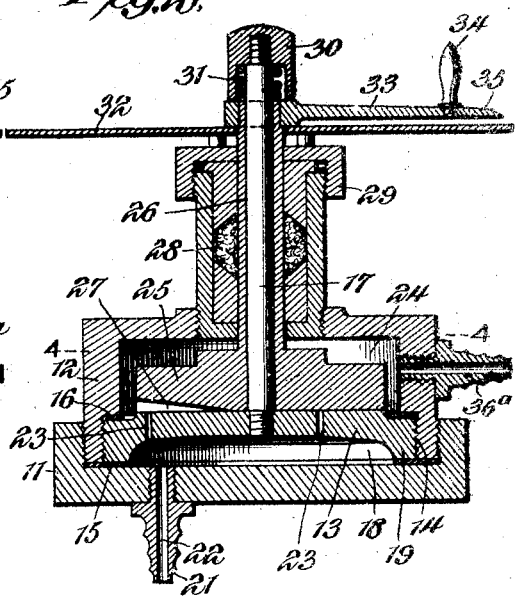
Figure 3:
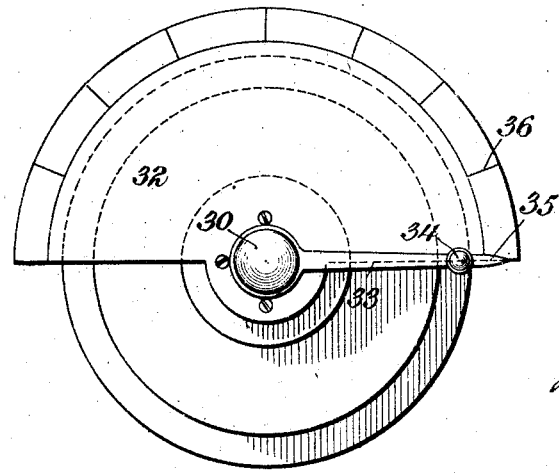
Figure 4:
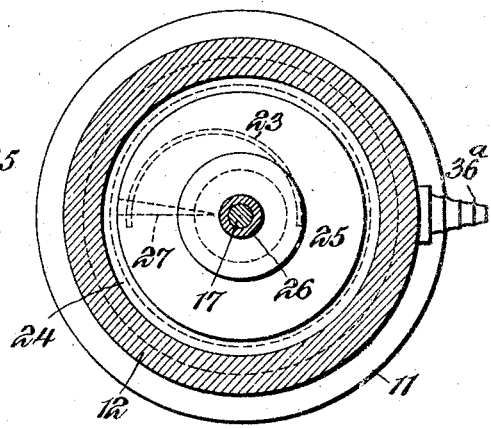
Figure 5:
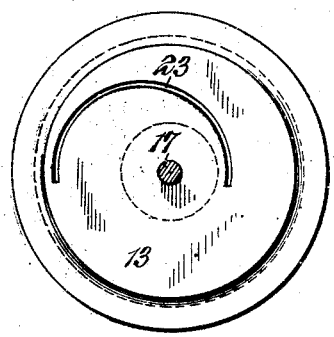
Figure 6:
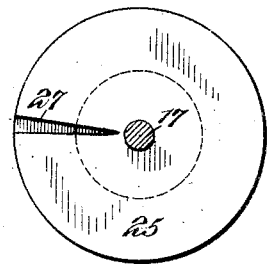
Figure 7:
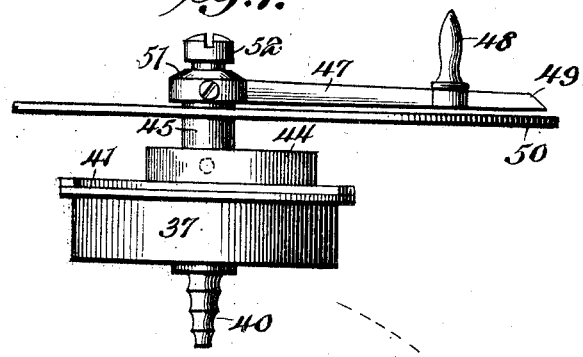
Figure 8:
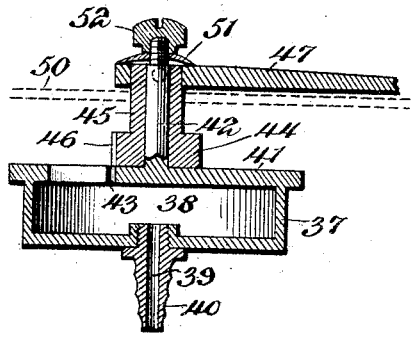
Figure 9:
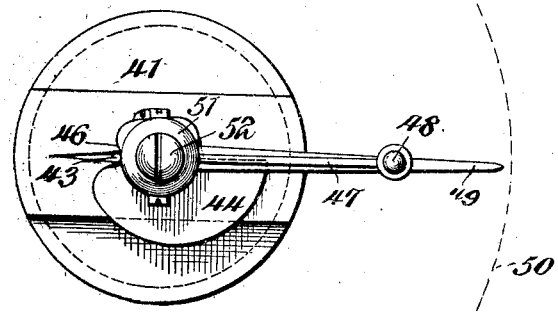
Figure 10:
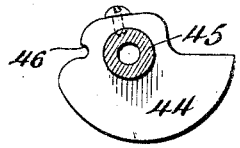
Figure 11:
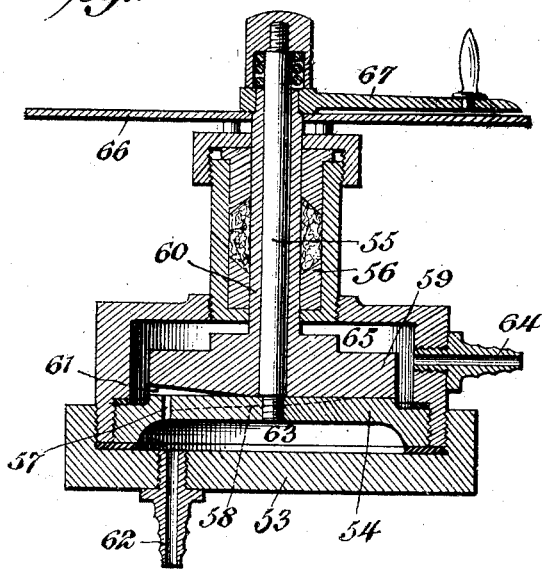
Figure 12:
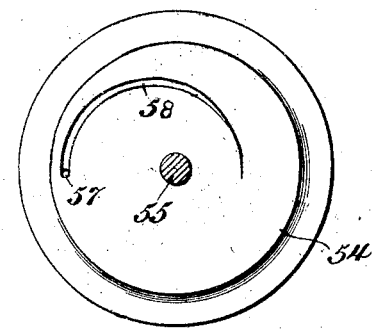
Figure 13:
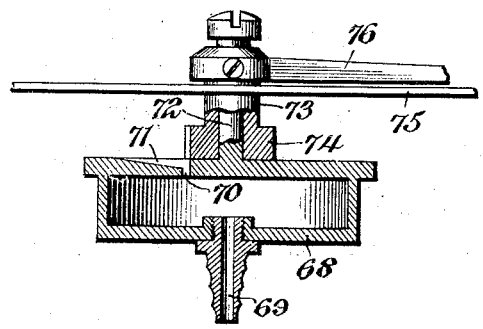
Figure 14:
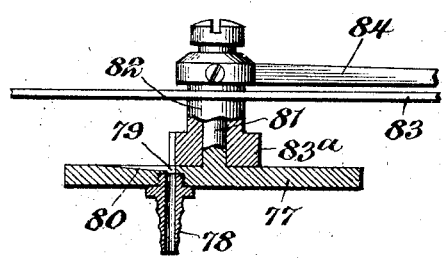

In the accompanying drawings, Figure 1 is a side elevation of one form of construction. Fig. 2 is a vertical sectional view therethrough. Fig. 3 is a top plan view. Fig. 4 is a horizontal sectional view taken on the line 4—4 of Fig. 2. Fig. 5 is a plan view of the lower casing section and valve seat member. Fig. 6 is a bottom plan view of the valve seat member. Fig. 7 is a side elevation of a modified form of construction.
Fig. 8 is a vertical sectional view therethrough. Fig. 9 is a plan view. Fig. 10 is a plan view of the valve chamber, showing the sleeve thereof in section. Fig. 11 is a sectional view through a slightly different construction from that disclosed in Fig. 2. Fig. 12 is a plan view of the valve seat member. Fig. 13 is a sectional view through a modification slightly different from that disclosed in Figs. 7–10. Fig. 14 is still another embodiment of the invention.

Similar reference numerals designate corresponding parts in all the figures of the drawings.

Referring first to the embodiment disclosed in Figs. 1–6 inclusive, a casing is employed comprising sections 11 and 12, the section 12 being threaded into the section 11, as clearly shown in Fig. 2. Interposed between the sections of the casing, and located within said casing, is a valve seat member 13 in the form of a disk that is threaded, as shown at 14 into the inner end of the section 12. Suitable packing gaskets 15 and 16 are preferably interposed between the opposite faces of the valve seat member 13 and the casing sections 11 and 12. A stem 17 extends centrally from the seat member 13 and projects centrally through the outer or upper wall of the casing section 12. The stem is shown as threaded into the seat member, but it may be secured in any suitable manner, or may be integral therewith, as will be evident. Surrounding the stem, and formed in the under side of the valve seat member is a chamber 18 forming an outer annular flange 19 that bears against the washer 15. A nipple 21, carried by said lower wall, has a bore 22 communicating with the chamber. A curved passageway 23 is cut through the seat member 13, so as to constitute means of communication between the chamber 18 and the chamber 24 formed within the casing section 12 above said seat member. The passageway 23, as shown in Fig. 5, extends part-way around the stem 17, being disposed eccentrically thereto.

A rotatable valve member 25 coöperates with the upper flat face of the seat member 13, and has a sleeve 26 surrounding and rotatable on the stem 17. The valve member 25 is located within the chamber 24, and is provided in its under side with a radially disposed inwardly tapered channel or passageway 27 that coöperates with the eccentric passageway 23 of the seat member. Leakage around the sleeve 26 is prohibited by a suitable packing gland 28 carried by the valve casing 12, and surrounding said sleeve. Both the sleeve and stem project above the cap 29 of the gland, and a cup-shaped retainer 30, screwed upon the upper end of the stem, houses a coiled spring 31 that bears against the outer end of the sleeve 26, and thereby yieldingly maintains the valve member 25 against the seat member. A suitable scale member in the form of a dial 32, is mounted between the gland and cap 30, and coöperating therewith, is a combined handle and pointer arm 33 that is secured to the sleeve 26, and has an actuating knob 34 thereon. The outer end of the arm 33 is pointed, as shown at 35, and coöperates with a scale 36 suitably marked upon the upper face of the dial, which scale may be designated as desired, to indicate the position of the channel or passage 27 with respect to the passageway 23, or to set forth the amount of fluid permitted to pass through the passageways 23 and 27 when the passageway 27 is in different positions over the passageway 23. A nipple 36ª, carried by the casing section 12, communicates with the chamber 24.

The operation of the structure is substantially as follows:—A supply conduit can be connected to either the nipple 21 or the nipple 36ª, and in like manner, an exhaust conduit is connected to the other nipple. These conduits lead from or to any suitable container, holder or mechanism. It will therefore be evident that if the pointer handle 33 is rotated, the valve 25 will be revolved, and different portions of the channel or passageway 27 will be carried into coacting relation with different portions of the eccentric passageway 23. Inasmuch as the different portions of the passageway 27 are of different cross sectional areas, the amount of fluid, whether liquid, gas or air, will be varied accordingly, or by turning the valve member so that the channel 27 is entirely out of coaction with the channel 23, the passage of fluid through the casing will be prohibited. Consequently as the pointer 35 will indicate on the scale the amount of fluid allowed to pass, it will be evident that the amount can be accurately and quickly determined.

A different form of construction is illustrated in Figs. 7-10 inclusive. In this embodiment, a casing 37 is employed having a single chamber 38 therein, with which communicates the bore 39 of the nipple 40. The upper wall 41 of the casing constitutes a valve seat member, and projecting therefrom is a central stem 42. A radial outwardly tapered passageway 43 is formed in the member 41 at one side of the stem. The valve member consists of a cam-shaped device 44 having a sleeve 45 journaled on the stem 42. This member 44 has a notch 46 that is movable into alinement with the inner end of the passageway 43, and the enlarged portion of said cam in rear of the notch is arranged to cover the passageway 43 either partially or wholly upon the rotation of the member, as will be evident. A combined pointer and handle arm 47, secured to the outer end of the sleeve 45, has an actuating knob 48 contiguous to its outer end, and said outer end is pointed, as shown at 49 to coöperate with the scale of a suitable dial 50. The valve member is held in coaction with the seat member by a spring disk 51 that bears against the outer end of the stem or handle member, and is urged into coacting relation therewith by a nut 52 threaded upon the outer end of the stem 42, and constituting retaining means for the parts. The present structure is much more simple than the first described embodiment, and is employed where the source of supply is drawn from or exhausted into the open air. It will be evident, however, that features of the invention are clearly present in this structure, and that the operation of the parts corresponds to that of the first described construction.

In the structure disclosed in Figs. 11 and 12, a sectional casing 53 is employed, and between the sections thereof is clamped a valve seat member 54. From this valve seat member rises a stem 55 that extends through the casing and through a stuffing box 56 mounted thereon. The valve seat member 54, as shown in Fig. 12 is provided with a passageway 57 therethrough and a channel 58 that extends from said passageway eccentrically to the stem 55, said channel tapering from the passageway to its outer end and extending but partially through the valve seat member 54. A rotatable valve member 59 has a sleeve 60 journaled on the stem 55, and said valve member is provided with a radially disposed channel or passageway 61 that is also tapered. Inlet nipples 62 communicate with a chamber 63 formed in or below the underside of the valve seat member 54, while another nipple 64 communicates with the chamber 65 in which the valve member is located. A dial plate 66 is mounted on the stuffing box, and a combined handle and pointer 67, connected to the sleeve 60, constitutes operating means for the valve seat member and an indicator showing the position thereof. The operation of the structure will be obvious. There is a decided advantage for extending the channels but partially through the members in that the flow of the fluid through the valve can be easily made to correspond to the indicating marks on the dial. For instance in making tests, the passageway can be readily enlarged wherever it is found necessary, or if it needs reducing in its cross sectional area at one or more points, the member can be faced off over its entire surface until no portion permits more flow than is indicated on the dial by the pointer and those portions which give less amounts of flow can be increased as desired.

In Fig. 13 another modification of the invention is disclosed. In this case, a casing 68 is employed, having a nipple 69 connected to one side and having a passageway 70 extending through its other side, this passageway being provided with an outwardly tapered channel 71 formed in the outer face of the casing wall. A stem 72 projects from said casing wall, and journaled thereon is a sleeve 73 carrying a cam 74 similar in all respects to the cam 44 shown in the structure disclosed in Figs. 7-10 inclusive. A dial 75 is located over the casing, and a combined handle arm and pointer 76, secured to the sleeve 73, constitutes means for actuating the cam or valve seat member, and also acts as a pointer or indicator therefor.

An exceedingly simple form of the invention is disclosed in Fig. 14. In this case, a plate 77 is provided, and has attached to one side a nipple 78 communicating with a passageway 79 in said plate. This passageway is also in communication with a channel 80 formed in the opposite side of the plate from which the nipple 78 projects. The plate has a stem 81 on which is journaled a sleeve 82 carrying a cam 83ª that operates over the passageway 79. A suitable dial plate 83 is associated with the structure above described, and a combined handle and pointer 84, secured to the sleeve 82, carrying the cam, operates over the dial plate. It will be observed that the structures disclosed in Figs. 13 and 14 closely approximate each other, the only difference being the air chamber in one that is not in the other. This emphasizes the fact that the conduit can be varied as desired.

In the structures disclosed in Figs. 11-14 inclusive, it will be noted that the channels extend only partially through the members containing them. This arrangement is advantageous for a number of reasons. In the first place, the channels are, as a matter of fact, very small, for the mechanism is particularly intended for use in connection with apparatus in which a high degree of accuracy is necessary. It would therefore be very expensive to form narrow accurately tapered channels completely through the members. Furthermore the member would be greatly weakened if the support for the valve had a slit in it for a comparatively great distance about the post. In addition to the above and perhaps most important is the fact that the maximum amount of air or fluid allowed to flow through the member is determined by the size of the small orifice through said member and not by the complete length of the channel.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In controlling means of the character set forth, the combination with a valve seat member, of a stationary stem projecting therefrom, said member having a passageway therethrough at one side of the stem, a rotatable valve journaled on the stem and having a portion movable on the outer face of the seat member to different positions over the passageway, and exposed actuating means connected to the valve and rotating around the stem as an axis for operating said valve.

2. In controlling means of the character set forth, the combination with a valve seat member, of a stationary stem projecting therefrom, said member having a passageway therethrough at one side of the stem, a rotatable valve journaled on the stem and having a portion movable on the outer face of the seat member to different positions over the passageway, an exposed handle connected to the valve and rotating around the stem as an axis for operating said valve, a retaining device mounted on the outer end of the stem, and a spring interposed between the device and the stem for yieldingly holding the valve on the seat.

3. In controlling means of the character set forth, the combination with a valve seat member, of a dial located in spaced relation to one of the faces thereof, a stationary stem projecting from said face of the member and projecting through the dial, a rotatable valve journaled on the stem and coöperating with said face of the seat member, a sleeve fixed to the valve and journaled on the stem, said sleeve projecting through the dial, and a combination handle and pointer fixed to the sleeve and operating over the dial.

4. In controlling means of the character set forth, the combination with relatively rotatable members, one of said members having a curved elongated channel, varying in cross sectional area from end to end and extending but partially through the members, said channel being disposed longitudinally of the line of movement of the members and eccentrically to the axis of rotation thereof, the other member covering and uncovering different portions of the channel on the relative movement of the members.

5. In controlling means of the character set forth, the combination with relatively rotatable members having coacting elongated channels disposed in angular relation and moving transversely of each other on the relative rotation of the members, said channels having portions extending but partially through the members and one of the channels varying in cross sectional area from end to end, different portions of the channels registering during the said relative rotation.

6. In controlling means of the character set forth, the combination with relatively rotatable members, one of which has a substantially radial tapered passageway, the other being provided with a passageway that is disposed eccentrically to the axis of rotation of the members to aline with different portions of the tapered passageway on the relative rotation of the members.

7. In controlling means of the character set forth, the combination with a valve seat member, of a valve rotatably mounted thereon, said valve seat member having a curved passageway disposed eccentrically to the axis of rotation of the valve member, and said valve member having a substantially radial passageway, different portions of which aline with different portions of the eccentric passageway on the rotation of the valve.

8. In controlling means of the character set forth, the combination with a valve seat having a stem, and a passageway extending about the stem and disposed eccentrically thereto, of a valve having a sleeve that is journaled on the stem, said valve also having a radially disposed tapered passageway movable over the eccentric passageway of the seat, and means for rotating the sleeve and valve.

9. In controlling means of the character set forth, the combination with a casing comprising sections, of a valve seat member interposed between the casing sections and having a journal bearing and a passageway disposed eccentrically to the same, a valve journaled on the bearing and having a tapered passageway that operates over the eccentric passageway upon the rotation of the valve member, and means for rotating said valve member.

10. In controlling means of the character set forth, the combination with a casing, of a valve seat member located in the casing and having a journal stem projecting therefrom and a passageway disposed eccentrically to the stem, a valve member having a sleeve journaled on the stem and having a tapered passageway that operates over the eccentric passageway, a scale element, and a handle pointer connected to the sleeve and operating over the scale member.

11. In controlling means of the character set forth, the combination with a casing comprising sections, of a valve seat member located between the sections and held against movement on the casing, said seat member having a stem projecting from one side and a chamber in its opposite side and being furthermore provided with a passageway disposed eccentrically to the stem and communicating with the chamber, a valve member having a sleeve journaled on the stem and operating upon the opposite face of the seat member to that having the chamber, said valve having a radially tapered passageway that moves over the eccentric passageway, nipples communicating with the interior of the casing on opposite sides of the valve seat member, a packing gland carried by the casing and surrounding the stem and sleeve, a dial located at the outer end of the packing gland, a combined handle and pointer secured to the sleeve and coöperating with the dial, and yielding means carried by the outer end of the stem and bearing against the outer end of the sleeve for urging the valve member against the seat member.

In testimony, that I claim the foregoing as my own. I have hereto affixed my signature in the presence of two witnesses.

FRED PARK STEVENS.

Witnesses:
WILLIAM V. HODGES,
EWALD W. HEINEMANN.